United States Patent [19]

Haupt et al.

[11] 3,912,687

[45] Oct. 14, 1975

[54] PROCESS FOR PREPARING HALOGEN-SUBSTITUTED AROMATIC POLYCARBONATES

[75] Inventors: Heinrich Haupt; Hugo Vernaleken, both of Krefeld; Kurt Weirauch; Ulrich Haberland, both of Krefeld-Bockum, all of Germany

[73] Assignee: Bayer Aktiengesellschaft, Leverkusen, Germany

[22] Filed: Mar. 13, 1974

[21] Appl. No.: 450,947

[30] Foreign Application Priority Data
Mar. 30, 1973 Germany............................ 2315888

[52] U.S. Cl............... 260/47 XA; 260/49; 260/860; 260/463
[51] Int. Cl.$^2$.................. C08G 63/62; C08G 75/28
[58] Field of Search.......................... 260/47 XA, 49

[56] References Cited
UNITED STATES PATENTS

| | | | |
|---|---|---|---|
| 3,334,154 | 8/1967 | Kim.................................. | 260/47 XA |
| 3,340,229 | 9/1967 | Bostian et al. ................. | 260/47 XA |
| 3,763,099 | 10/1973 | Jaquiss........................... | 260/47 XA |

*Primary Examiner*—Wilbert J. Briggs, Sr.
*Attorney, Agent, or Firm*—Lawrence S. Pope

[57] ABSTRACT

A process is provided for making high molecular weight halo-substituted aromatic polycarbonates in a phase boundary reaction in which an o,o,o′,o′-tetrahalogenobisphenol and phosgene are reacted in an aqueous medium at a pH of 7 to 9 in the presence of from 2 mol% to 20 mol% catalyst in a first step and the resulting product is polycondensed at a pH of at least about 13 in a second step.

10 Claims, No Drawings

PROCESS FOR PREPARING HALOGEN-SUBSTITUTED AROMATIC POLYCARBONATES

This invention relates generally to polycarbonate plastics and more particularly to an improved process for the preparation of polycarbonates from aromatic dihydroxy compounds of which 50-100 mol% are bisphenols of the general formula

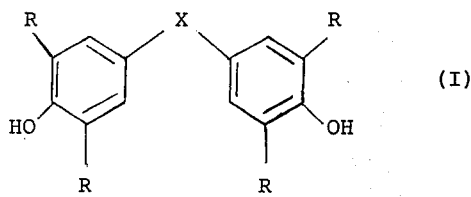

(I)

wherein

R is chlorine or bromine, and

X is $C_1$–$C_6$ alkylene, $C_2$–$C_6$ alkylidene, $C_5$–$C_{15}$ cycloalkylene, $C_5$–$C_{15}$ cycloalkylidene, a single bond, —O—, —S—, —SO—, $SO_2$—, —CO— or

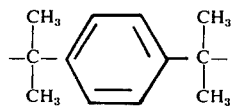

The preparation of high molecular weight aromatic polycarbonates from bisphenols, such as 2,2-bis-(4-hydroxyphenyl)-propane (bisphenol A) and phosgene in a phase boundary reaction has been known for a long time. In this reaction, phosgene is passed into a well-stirred two-phase mixture of an aqueous alkaline bisphenolate solution of a polycarbonate solvent, such as tetrachloroethane or methylene chloride.

To accelerate the reaction of bisphenol A and phosgene and to obtain high molecular weight products, it is recommended to add catalysts, such as quaternary ammonium compounds and arsonium compounds or tertiary amines (compare DT-PS 1,046,311) before or after the phosgenation. The catalyst concentration may be up to 1% by weight (referred to the bisphenols employed).

The disclosed process is only possible if the condensation of phosgene with the bisphenol takes place distinctly more rapidly than the saponification of phosgene so it can be employed successfully only with bisphenols of the activity corresponding to that of bisphenol A.

In such reactions it is customary and advantageous to add the catalyst after the phosgenation. If the catalyst is present at the beginning of the phosgenation a large part of the phosgene is saponified and the average molecular weights achievable of the polycarbonates obtained are low, respectively a large amount of bisphenol remains unreacted.

These known procedures adaptable to the reaction of bisphenol A with phosgene are not satisfactory for condensing o,o,o',o'-tetrahalogenobisphenols of the above general Formula (I) with phosgene. The reactivity of these bisphenols is reduced by the steric hindrance of the OH groups by the double ortho-substitution, and by the low basicity and nucleophilic character of these bisphenols.

This is illustrated by pK values measured in 1:1 per weight methanol:water

| | $pK_1$: | | $pK_2$: | |
|---|---|---|---|---|
| Bisphenol A | 10.2 | | 11.2 | |
| Tetrabromobisphenol A | 7.6 | | 8.5 | |
| Tetrachlorobisphenol A | 7.0 | | 8.4 | |

Thus, no high molecular polycarbonates are obtained in the phosgenation of the bisphenols of low reactivity of the above general Formula (I) by the conventional processes using 1.2 to 1.5 mols of phosgene/mol of bisphenol, such as is desirable for economic reasons. The polycarbonate resulting from this reaction is low molecular and contains still proportions of chlorocarbonic acid ester end groups. The conversion of bisphenol is incomplete since substantial proportions of phosgene are saponified. With the customary amount of triethylamine, of approximately 1% by weight, such as is recommended for the polycondensation reaction of bisphenol A to form a polycarbonate, high molecular polycarbonates free of chlorocarbonic acid ester are not obtained from such phosgenation intermediate products even over the course of rather long reaction times of 1-2 hours.

The use of higher catalyst concentrations greater than 2% by weight also does not promise success, since under these conditions a molecular weight degradation is observed and hence no high molecular products result.

If it is nevertheless desired to prepare a high molecular weight polycarbonate from o,o,o',o'-tetrahalogenobisphenols, it has hitherto been necessary to carry out the condensation in a homogeneous phase, as described for tetrabromobisphenol A in U.S. Pat. No. 3,334,154.

It is, therefore, an object of this invention to provide an improved process for making polycarbonates from o,o,o',o'-tetrahalogenobisphenols. Another object of the invention is to provide a method for preparing aromatic polycarbonates from o,o,o',o'-tetrahalogenobisphenols and phosgene in a phase boundary reaction. A more specific object of the invention is to provide a method for making high molecular weight polycarbonates by a phase boundary reaction of phosgene and aromatic dihydroxy compounds of which from 50 mol% to 100 mol% are bisphenols of Formula (I) set forth hereinbefore.

The foregoing objects and others are accomplished in accordance with this invention, generally speaking, by providing a process wherein an aromatic dihydroxy compound of the general Formula (I) or a mixture of aromatic dihydroxy compounds which includes at least 50 mol% of dihydroxy compounds of Formula (I) is reacted with phosgene in a phase boundary reaction in a first step in an aqueous alkaline phenolate solution at a pH of between 7 and 9 in the presence of from 2 mol% to 20 mol% (referred to the dihydroxy compound(s) employed) of a catalyst for the reaction to form an oligocarbonate having chlorocarbonic acid ester groups and —OH end groups in a ratio greater than 1.1 to 1, respectively, and, in a second step, effecting polycondensation at a pH of at least 13 until a polycarbonate is formed. The homopolycarbonates or copolycarbonates are obtained by the phase boundary condensation process, through a two-stage amine-catalyzed reaction of the corresponding bisphenols with phosgene. It has now been found, surprisingly, that polycarbonates can be prepared from aromatic dihydroxy compounds, of which more than 50 mol% are tetrahalogenobisphenols of the general Formula (I), by phase boundary reaction of the appropriate starting components, if the following reaction conditions are observed in a continuous two-stage process:

1. phosgenation of the corresponding bisphenols in the presence of 2–20 mol% (referred to the dihydroxy compound(s) employed) of a catalyst preferably of a tertiary amine, at a low pH value, which is generally between 7 and 9, in order to obtain precondensates with an end group ratio of chlorocarbonic acid ester to OH of more than 1.1 to 1, respectively; and
2. polycondensation of the resulting phosgenation intermediate products at a higher pH value and, if appropriate, a higher catalyst concentration to give a polycarbonate which is free of chlorocarbonic acid ester groups. In this stage, the pH value is increased to at least pH 13 by addition of an aqueous alkali metal hydroxide solution. The OH concentration referred to the aqueous phase is then between 0.2 % and 0.4 % by weight.

The reaction time in the first stage is about 5–10 minutes but can also be shorter, while the reaction time in the second stage is 10–60 minutes.

The molar ratio of phosgene to bisphenol should be 1.1-1.5, preferably 1.2-1.3. The polycarbonates obtained have average molecular weights between 5,000 and 50,000.

If the phosgenation is carried out in accordance with the process of the invention without the addition of catalysts, 1.3–1.5 mols of phosgene per mole of bisphenol in the first stage do not suffice to give a phosgenation intermediate product having the desired end group ratio of chlorocarbonic acid ester to OH>1, since the bulk of the phosgene is saponified.

However, if phosgenation is carried out under otherwise identical conditions in the presence of a high catalyst concentration, the reaction of the tetrahalogenobisphenols with phosgene is, surprisingly, accelerated more strongly than is the saponification of phosgene.

This discovery is surprising inasmuch as it is known, from the condensation of sterically unhindered bisphenols, that a point in time a which the catalyst is added — before the phosgenation — has a bad influence on the polycondensation reaction.

An extremely high catalyst concentration surprisingly produces no degradation of the polycondensate in the case of polycarbonates from bisphenols of the general Formula (I) if the reaction mixture is subsequently stirred for a prolonged period while, for example, a polycarbonate from bisphenol A passed through a molecular weight maximum under similar conditions.

A preferred embodiment of the process according to the invention is the manufacture of copolycarbonates based on a mixture of bisphenols which contain more than 50 mol% of bisphenols of the general Formula (I) and the corresponding chlorine-free and/or bromine-free bisphenols.

Under the stated reaction conditions of the process according to the invention, the first stage of the reaction gives, surprisingly, practically only reaction products of phosgene with the bisphenols of the general Formula (I), while the more basic bisphenols which are not sterically blocked in the o-position remain in the form of the bisphenolates in the aqueous alkaline solution and are only quantitatively co-condensed during the polycondensation reaction which takes place in the second stage at an increased pH value and an OH concentration (referred to the aqueous phase) of between 0.2 % and 0.4 % by weight; the copolycarbonates obtained can have molecular weights between 5,000 and 50,000.

Any suitable bisphenols of the general Formula (I) may be used including in particular 2,2-bis-(4-hydroxy-3,5-dichlorophenyl)-propane (tetrachlorobisphenol A), 2,2-bis-(4-hydroxy-3,5-dibromophenyl)-propane (tetrabromobisphenol A), 1,4-bis(-4-hydroxy-3,5-dibromophenylisopropylidene)-benzene, 1,4-bis-(4-hydroxy-3,5-dichlorophenylisopropylidene)-benzene, bis-(4-hydroxy-3,5-dichlorophenyl)-methane, bis-(4-hydroxy-3,5-dichlorophenyl)-sulphone, bis-(4-hydroxy-3,5-dichlorophenyl)-sulphide, bis-(4-hydroxy-3,5-dichlorophenyl)-ether, 1,1-bis-(4-hydroxy-3,5-dichlorophenyl)-cyclohexane (tetrachlorobisphenol Z), 1,2-bis-(4-hydroxy-3,5-dichlorophenyl)-1,1-dimethylethane, bis-(4-hydroxy-3,5-dibromophenyl)-methane, bis-(4-hydroxy-3,5-dibromophenyl)-sulphone, bis-(4-hydroxy-3,5-dibromophenyl)-sulphide, bis-(4-hydroxy-3,5-dibromophenyl)-ether, 1,1-bis-(4-hydroxy-3,5-dibromophenyl)-cyclohexane, 1,2-bis-(4-hydroxy-3,5-dibromophenyl)-1,1-dimethylethane and the like.

Any aromatic dihydroxy compounds known for polycarbonates, such as resorcinol, hydroquinone, dihydroxydiarylalkanes, preferably bisphenol A, tetramethylbisphenol A, and bisphenol Z, dihydroxydiaryl-ethers, -ketones, -sulphides, -sulphoxides and -sulphones and the corresponding alkyl-substituted compounds may be used as the second starting compound for the preparation of copolycarbonates.

Any suitable chain stopper may be used, for example, the monophenols such as, phenol, p-tert.-butylphenol, 2,4,6-tribromophenol and pentabromophenol.

Any suitable solvent, such as the water-immiscible aliphatic and aromatic chlorinated hydrocarbons which are customarily used in making polycarbonates may be used in practicing the invention, for example, methylene chloride, chloroform, 1,2-dichloroethane and chlorobenzene, and also mixtures of these solvents.

The reaction temperature can be selected freely within wide limits. Advantageously, the reaction is carried out at temperatures below the boiling points of the solvent.

Any suitable catalyst capable of catalyzing the reaction of a bisphenol and phosgene to prepare a polycarbonate may be used. Ammonium compounds and phosphonium compounds and tertiary amines such as, for example, triethylamine, tributylamine and dimethylbenzylamine are particularly suitable. The concentration range is 2–20 mol%, referred to the dihydroxy compound(s) employed.

The halogen-containing polycarbonates and their mixtures with halogen-free polycarbonates are outstandingly suitable for the manufacture of moldings, films and fibers which in addition to the known properties of polycarbonate possess improved flame-resistance or non-inflammability, a high heat distortion point and reduced sensitivity towards reagents which split carbonate bonds. In addition, they also serve for the flameproofing of other plastics.

EXAMPLE 1

7.15 kg/hour of a solution of 4,300 g of tetrabromobisphenol A, 45 g of tribromophenol, 2 g of sodium borohydride, 81 g of triethylamine (10 mol% relative to bisphenol), 2,135 g of 45% strength aqueous sodium hydroxide solution and 22 kg of water are reacted, in a reactor of about 2 liter capacity, with 287 g/hour of phosgene, with the addition of 9 kg/hour of methylene chloride, at about 25°C. The pH value is about 7.

320 ml of 17% strength aqueous sodium hydroxide solution are metered hourly into the first kettle of the three-stage stirred kettle cascade which follows the reactor and has a total volume of approximately 12 liter so that a pH value of 13.5 is maintained.

After the reaction mixture has passed through the cascade the organic phase is separated off and washed with water until free of electrolyte. After evaporation of the solvent, a colorless, tough polycarbonate of relative viscosity 1.182, measured in methylene chloride at 25°C with $c = 5$ g/l, is obtained. The saponifiable chlorine content is 4 ppm. The aqueous reaction phase is free of tetrabromobisphenol A, which indicates a quantitative conversion of the bisphenol.

EXAMPLE 2

7.8 kg/hour of a solution of 3.66 kg of tetrachlorobisphenol A, 24 kg of water, 25 g of tertiary butylphenol, 2 g of sodium borohydride, 50 g of triethylamine (equal to 5 mol % relative to bisphenol) and 2.5 kg of 45% strength aqueous sodium hydroxide solution are reacted, with addition of 8.5 kg of methylene chloride, with 321 g/hour of phosgene at approximately 24°C under the same apparatus conditions as in Example 1. The pH value is about 8.

In the first pot of the cascade, 470 g of 17% strength aqueous sodium hydroxide solution are metered in, as a result of which the pH value rises to 13.4. After the reaction mixture has passed through the cascade it is worked up as described in Example 1. Relative viscosity 1.18.

EXAMPLE 3

6.9 kg/hour of a solution of 2,170 g of tetrabromo bisphenol A, 910 g of bisphenol A, 2 g of sodium borohydride, 60 g of triethylamine (equal to 7.5 mol % relative to bisphenols), 30 g of tertiary butylphenol, 2,110 g of 45% strength aqueous sodium hydroxide solution and 22 kg of water are reacted, with the addition of 9 kg/hour of methylene chloride, with 266 g/hour of phosgene at about 22°C under the same apparatus conditions as in Example 1. The pH value in the reactor is about 8.

In the first pot of the stirred kettle cascade, 290 ml/hour of 17% strength aqueous sodium hydroxide solution are metered in, whereby the pH value rises to 14.0.

Working up takes place as described in Example 1. Relative viscosity 1.21; bromine content: 38.8%.

EXAMPLE 4

9.9 kg/hour of a solution of 1.78 kg of bisphenol A, 6.66 kg of tetrachlorobisphenol A, 71.1 kg of water, 6.18 kg of aqueous sodium hydroxide solution, 52.5 g of p-tert.-butylphenol, 5 g of sodium borohydride and 52.5 g of triethylamine (2 mol % relative to bisphenol) are reacted with 0.355 kg/hour of phosgene, with addition of 9.5 kg/hour of 60/40 methylene chloride/-chlorobenzene, under the same conditions as in Example 1. The pH value is about 8.5.

0.17 kg/hour of 45% strength aqueous sodium hydroxide solution and 300 g of 2% strength aqueous triethylamine solution (2 mol % relative to bisphenol) are metered into the first stirred pot of the cascade. The pH value is 13.8.

The further reaction and working up take place analogously to Example 1. Relative viscosity: 1.25. Inorganic and saponifiable chlorine 8 ppm. Chlorine content: 28.4%.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. In a process for the preparation of polycarbonates which comprises reacting phosgene with an aromatic dihydroxy compound of the general formula

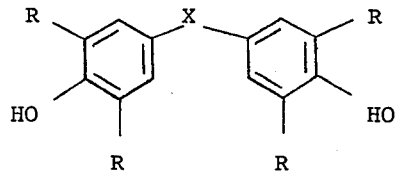

in which
R is chlorine or bromine and
X is $C_1-C_6$ alkylene, $C_2-C_6$ alkylidene, $C_5-C_{15}$ cycloalkylene, $C_5-C_{15}$ cycloalkylidene, a single bond, —O—, —S—, —SO—, —SO$_2$—, —CO— or

or a mixture of aromatic dihydroxy compounds of which at least 50 mol% is of the said formula in a phase boundary condensation process, the improvement wherein an aqueous-alkaline solution containing the compound of the formula is reacted with phosgene in a first stage at a pH of between 7 and 9 in the presence of about 2 mol% to 20 mol% (referred to the dihydroxy compound(s) employed) of a catalyst for the reaction to give an oligocarbonate with an end group ratio of chlorocarbonic acid ester to OH of greater than 1.1 to 1 respectively, and in a second stage the oligocarbonate is polycondensed at a pH of more than 13 and at an OH concentration (referred to the aqueous phase) between 0.2 and 0.4% by weight without any further addition of phosgene.

2. The process of claim 1 wherein the catalyst is a tertiary amine.

3. The process of claim 1 wherein the bisphenol reacted with phosgene is tetrabromobisphenol A, tetrachlorobisphenol A, or a mixture of tetrabromobisphenol A or tetrachlorobisphenol A with bisphenol A.

4. Polycarbonates obtained by the process of claim 1.

5. The process of claim 1 wherein the catalyst concentration is greater in the second stage than in the first stage.

6. The process of claim 6 wherein the amount of catalyst added in the second stage is from 2 mol% to 20 mol% referred to the dihydroxy compound(s) employed.

7. The process of claim 2 wherein the tertiary amine is triethylamine.

8. In the preparation of a polycarbonate by reacting phosgene with an o,o,o',o'-tetrahalogenobisphenol in a phase boundary reaction, the improvement which comprises continuously mixing a substantially water insoluble solvent for a polycarbonate, phosgene and an o,o,o',o'-tetrahalogenobisphenol in an alkaline aqueous medium at a pH of about 7 to about 9 containing from about 2 mol% to about 20 mol% (referred to the dihydroxy compound(s) employed) of a catalyst which promotes reaction between a bisphenol and phosgene until an oligocarbonate with an end group ratio of chlorocarbonic acid ester to OH of greater than 1.1 to 1 is produced, then adjusting the pH of the resulting mixture to at least about 13 maintaining said mixture until polycondensation with the formation of a high molecular weight polycarbonate.

9. The process of claim 8 wherein the o,o,o',o'-tetrahalogenobisphenol A is at least 50 mol% of a mixture of bisphenols.

10. In the process of claim 8 the further improvement wherein the catalyst is a tertiary amine.

* * * * *

UNITED STATES PATENT AND TRADEMARK OFFICE
CERTIFICATE OF CORRECTION

PATENT NO. : 3,912,687
DATED : October 14, 1975
INVENTOR(S) : HEINRICH HAUPT, HUGO VERNALEKEN, KURT WEIRAUCH AND ULRICH HABERLAND It is certified that error appears in the above-identified patent and that said Letters Patent are hereby corrected as shown below:

In caption [30], Foreign Application Priority Data, please insert

--Feb. 20, 1974 Germany ..............2408068--.

Signed and Sealed this

Fourth Day of January 1977

[SEAL]

Attest:

RUTH C. MASON
*Attesting Officer*

C. MARSHALL DANN
*Commissioner of Patents and Trademarks*